United States Patent Office 3,509,017
Patented Apr. 28, 1970

3,509,017
MULTI-LAYERED PYROLIZED PARA-POLYPHEN-YLENE STRUCTURES AND METHOD OF MAKING SAME
Oliver E. Accountius, Tarzana, Calif., assignor to North American Rockwell Corporation, a corporation of Delaware
No Drawing. Filed July 22, 1966, Ser. No. 567,089
Int. Cl. B32b 13/04
U.S. Cl. 161—206                                                  8 Claims

ABSTRACT OF THE DISCLOSURE

A method of making a multi-layered structure from para-polyphenylene, para-polyphenylene containing a metal, or para-polyphenylene containing a filler, said method comprising pressing the layers to produce a multi-layered structure and then pyrolyzing said para-polyphenylene containing layers.

---

This invention relates to multi-layered structures and their method of fabrication. More particularly, the invention relates to multi-layered structures utilizing pyrolyzed polyphenylene as a continuous phase in their method of manufacture.

In co-pending application, Ser. No. 492,315, filed Oct. 1, 1965, by the same inventor, there is disclosed a method for forming graphitic-like material. The method described therein involves the compacting of a polyaromatic compound, particularly para-polyphenylene. After compaction of the compound, which is normally in the powder form, it is then subjected to pyrolysis to produce a resultant graphitic-like structure. Additionally, that co-pending patent application discloses the formation of carbides in situ by initially compacting with the para-polyphenylene an amount of the material desired to be carburized. For example, silicon carbide, is formed when the stoichiometric amount of silicon and polyphenylene are initially mixed in a powder form, compacted, and subsequently pyrolyzed. In this process, the pyrolysis converts the polyphenylene to a graphitic-like material and causes it to combine with the silicon to form beta silicon carbide. Virtually any other carbide can be formed according to the same method. The para-polyphenylene which has been converted to a graphitic-like material has the same utilization that carbon or graphite has. For example, it can be used as heat protective material. Silicon carbide, or other carbides that are formed, have end uses which are well known in the art for such materials, such as heat shields, high strength abrasive material, and the like. In addition to the above-described materials, the pyrolyzed polyphenylene can serve as a binder for metal and ceramic powders.

The herein disclosed invention provides coherent multi-layered structures wherein the layers all contain the compacted pyrolyzed polyphenylene or are derived therefrom. The layers are individually selected from a composition containing the carbides formed in situ, polyphenylene containing a filler and plain polyphenylene. To briefly describe the invention, a bi-layered structure of pyrolyzed polyphenylene and a carbide are used as an example.

The herein disclosed invention comprises disposing as a first layer in a die para-polyphenylene powder to a desired thickness. On top of the layer of para-polyphenylene is then disposed a mixture of the para-polyphenylene and the material desired to be carburized. For example, silicon mixed with para-polyphenylene. The second layer is, once again, disposed to a desired thickness. Upon compaction of the powders in the die, the materials are compacted into a bi-layered structure. The structure is then removed from the die and placed in an appropriate oven where pyrolysis temperature is achieved. The resultant product is then a coherent bi-layered structure wherein one layer is comprised of graphitic-like material having disposed thereupon a second layer of a carbide; as in this example, silicon carbide. Depending upon the die utilized, the multi-layered structure can be of virtually any configuration, as can be appreciated. The carbide layer provides good oxidation resistance and protective characteristics when used in a high-temperature environment, while the graphitic-like layer or back-up material provides good thermal conduction and acts as a heat sink. Thus the bi-layered structure finds utility particularly as a heat protective body possessing the particular advantages of both carbide material and graphite. Though a bi-layered structure is discussed, virtually any number of layers can be made into a coherent body in accord with the invention. The die size and orientation are the only limiting factors.

The mechanical pressures used to compact the bodies of the invention range from 1000 to 120,000 p.s.i. The bodies may be pyrolyzed at 1000° C. and higher. When a carbide is formed, the temperature of pyrolysis normally would be governed by that temperature which is required to form the carbide in the appropriate layer. It has been found that during pyrolysis shrinkage occurs in the layers of material. For example, in uniaxially pressed powders shrinkage will, upon pyrolysis, occur normal to the pressing direction. It is thus important that the shrinkage of each adjacent layer be equivalent. If one layer of material were to shrink more than the other, separation can occur. It should be apparent, however, that a controlled differential in shrinkage between the adjacent layers can be effectively utilized for compressive loading of one of the layers. Thus, one of the most important factors involved in the method of the instant invention relates to matching the shrinkage rates of the layers of material formed. For example, if a layer of silicon carbide is desired, then the starting amount of polyphenylene and silicon powder are controlled by the stoichiometry required to form the silicon carbide. Forming a disc of this material, the shrinkage can then be measured. For example, at 1400° C., a silicon-polyphenylene combination pressed uniaxially at 100,000 p.s.i. was found to have a shrinkage normal to the direction of pressing of 3.8 percent. Thus, if it was desired to bond to the layer of silicon carbide a graphitic layer, it was found that a mixture of 63 weight percent graphite and 37 weight percent polyphenylene composition when pressed at 100,000 p.s.i. and subjected to a pyrolyzation temperature of 1400° C., shrank at 3.8 percent in a direction normal to pressing. This was determined from a series of tests varying the amount of graphite powder to polyphenylene prior to shrinkage. When combining the two layers, pressing the two layers at 100,-000 p.s.i. and subjecting the compacted mass to a pyrolyzation temperature of 1400° C., a coherent structure having a layer of silicon carbide affixed to a layer of graphitic-like material is obtained.

The invention has been generally described with regard to forming carbides in situ in one layer with the other layer being polyphenylene. It should be pointed out, as previously indicated, that the concept of this invention is applicable to forming any multi-layered structure where polyphenylene is the continuous matrix between the layers, and upon pyrolysis will serve to bond the layers together. Thus, in its broadest aspects, the invention relates to forming multi-layered structures of polyphenylene containing various other desirable powders. For example, powdered graphite has been used as indicated; carbides, boron, silicides, metals and other materials, preferably in powder form, can be incorporated as filler material for desired purposes with in the polyphenylene prior to compaction to form carbides. Silicon, titanium, zirconium, molybdenum, and the like may be incorporated in the polyphenylene in a stoichiometric amount required to form the carbides thereof at the pyrolysis temperature. In all instances, the main criteria to accomplish the desired end result of having a multi-layered structure with coherency between layers is that the relative shrinkage of each layer be essentially the same, or alternatively, as previously indicated, a slight difference if the pre-stressing force is desired to be incorporated into the end structure. Not only can the materials previously mentioned be utilized, but various powdered metals, metalloids, and compounds which do not react with the polyphenylene upon pyrolysis in the same manner as the carbides and borides, etc. It is believed that the invention will be better understood in the following detailed examples.

EXAMPLE I

An experiment was conducted to determine if silicon carbide could be successfully made in accord with the invention. Thus, a mixture containing a stoichiometric amount of −300 mesh silicon and powdered para-polyphenylene was made in an atom ratio of 1:1, the carbon calculated to have an 85 percent yield from the pyrolysis of the polyphenylene. This is equivalent to a weight ratio of silicon to polyphenylene of 63:37. The powder mixture was then placed in a two-punch die and pressed. The die was one inch in diameter. The powder was pressed uniaxially at 100,000 p.s.i. The pressed disc formed was then removed from the die and placed in an oven and kept at 1000° C., for one hour. This left a mixture of silicon and carbon. Pyrolysis at 1400° C. for one hour, however, yielded beta silicon carbide. Analysis was made by X-ray diffraction.

EXAMPLE II

With the knowledge that silicon carbide could be formed in situ, bilayered discs were then made wherein one layer was silicon carbide. Bilayered discs of a silicon-polyphenylene mixture and pure polyphenylene was pressed uniaxally at 100,000 p.s.i. It pyrolyzed at 1400° C. The pyrolysis shrinkage of the two materials normal to the pressing direction was different and caused substantial warping and in some instances separation of the two materials during pyrolysis. As a result, it was obvious that adjustment had to be made in the one layer that could be adjusted; namely, the pure polyphenylene layer so as to compensate for shrinkage in the silicon carbide layer.

EXAMPLE III

The pyrolysis shrinkage at 1400° C. for the pressed silicon-polyphenylene combination in a direction normal to pressing was determined to be 3.8 percent. The shrinkage in a direction parallel to the direction of pressing is of no moment since this is not what caused separation. A study was then made of the shrinkage normal to the pressing direction of a series of −100 mesh graphite in polyphenylene discs, pressed uniaxially at 100,000 p.s.i. The study showed a fairly linear change in the dimension ranging from an expansion of 1.1 percent at 90 percent graphite to a shrinkage of 9.3 percent at 30 percent graphite. After a series of the tests, a plot of the shrinkage on the direction normal to the pressing first with the graphite concentration disclosed that a 63 percent graphite-37 percent polyphenylene composition gave the same shrinkage as the silicon-polyphenylene material. It appears coincidental that the 63:37 ratio is the same for the silicon to polyphenylene as it is for the graphite to polyphenylene layers.

EXAMPLE IV

Several bi-layered discs one inch in diameter of a layer of 63 percent silicon and 37 percent polyphenylene, 63 percent graphite and 37 percent polyphenylene in the other layer were pressed uniaxially at 100,000 p.s.i. The final thickness of the disc after pyrolysis at 1400° C. varied from $1/16$ to $3/8$ inch. Various techniques were utilized to make the disc. One technique utilized loading the die with one powder, smoothing the surface of the powder, and adding the second composition. This was then followed by the pressing. The second method, employed in these tests, involved pressing each powder separately, roughening the surface, and then pressing the two products together. The third method involved pressing on the composition at 100,000 p.s.i. and adding the other powder and repressing to 100,000 p.s.i. All three of the methods for making the bi-layered structure worked. However, it appeared that the first method was most successful. This was most likely due to additional mechanical interlock. Additionally, since the first method was most successful and did not involve any intermediate working step, it is the most preferable method to be used. The two layers resulting from the pyrolyzed discs made showed excellent cohesion within the layer and between the layers. No warpage during pyrolysis occurred. The layers could not be separated by prying, heating, or hammering.

EXAMPLE V

To test the oxidation resistance and protective characteristics of the silicon carbide layer of the disc made in accord with the foregoing Example IV, oxidation tests were made by heating the silicon carbide face to about 2000° C. with an oxyacetylene torch. The surface was as oxidative resistant as normal silicon carbide bodies. Additionally, the temprature of the graphitic layer behind the silicon carbide layer arose due to the thermal conduction with the resultant oxidation of that phase as was to be expected. This thus, provided an excellent heat shield combination wherein a body having good oxidation resistance, yet good thermal conduction was provided.

EXAMPLE VI

A series of concentric cylinders having silicon-poylphenylene on the inside with graphite-polyphenylene on the outside were made. This was accomplished by placing a paper sleeve approximately one inch in diameter inside the one inch diameter die and first filling the inside of the paper sleeve with the silicon-polyphenylene composition. Then the volume between the sleeve and the die was filled with a graphite-polyphenylene composition. The paper sleeve was removed and the composite specimen pressed uniaxially at about 750 p.s.i. to give sufficient strength for handling. The material was then removed from the die and the specimen was then bagged in a thin rubber bag and pressed isostatically at 40,000–50,000 p.s.i. with subsequent pyrolysis at 1400° C. The samples retained their structural integrity and a concentric silicon carbide-graphite cylinder was formed.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A method of making multi-layered structures comprising:
   forming successive layers of para-polyphenylene powder wherein adjacent layers are consecutively chosen from compositions consisting of para-polyphenylene alone, para-polyphenylene containing a stoichiometric amount of a metal which will carburize, and para-polyphenylene containing inert fillers;
   pressing said layers at a pressure sufficient to produce a solid coherent multi-layered structure; and
   subjecting said compacted structure to a temperature at which at least pyrolyzation of said para-polyphenylene occurs.

2. The method of claim 1 comprising pressing said powders at above 1000 p.s.i..

3. The method of claim 1 comprising pressing said layers uniaxially.

4. The method of claim 1 comprising pressing said layers isostatically.

5. The method of claim 1 wherein the compositions of said layers are selected such that their shrinkage upon pyrolysis is essentially equivalent.

6. The method of claim 1 wherein the composition of one layer is formed by mixing para-polyphenylene and graphite powder, and the composition of a second layer is formed by mixing silicon and para-polyphenylene powder in the stoichiometric amount to form silicon carbide upon pyrolysis.

7. The method of claim 6 wherein said one layer is 63 weight percent para-polyphenylene and 37 weight percent graphite, while the other layer is 63 weight percent para-polyphenylene and 37 weight percent silicon.

8. A composite structure comprised of successive layers of pyrolyzed para-polyphenylene wherein adjacent layers are consecutively chosen from para-polyphenylene alone, a metal carbide resulting from the reaction of the metal with para-polyphenylene, and pyrolyzed para-polyphenylene containing inert filler.

References Cited

UNITED STATES PATENTS

| | | | |
|---|---|---|---|
| 3,057,687 | 10/1962 | Mitchell | 23—209.1 |
| 3,345,440 | 10/1967 | Googin et al. | 264—29 |
| 3,367,811 | 2/1968 | Baer et al. | 156—89 |
| 3,385,723 | 5/1968 | Pickar | 23—209.4 X |
| 3,393,085 | 7/1968 | Howard et al. | 161—206 X |

HAROLD ANSHER, Primary Examiner

U.S. Cl. X.R.

23—208, 209.1, 209.4; 156—155, 306